Feb. 1, 1944.  F. E. WIRTZ  2,340,291
STATOR INSULATING MACHINE
Original Filed Feb. 20, 1941   10 Sheets-Sheet 1

INVENTOR
FRANK E. WIRTZ
BY *Spencer, Hardman & Johr*
his ATTORNEYS

Feb. 1, 1944.  F. E. WIRTZ  2,340,291
STATOR INSULATING MACHINE
Original Filed Feb. 20, 1941   10 Sheets-Sheet 2

INVENTOR
FRANK E. WIRTZ
BY
his ATTORNEYS

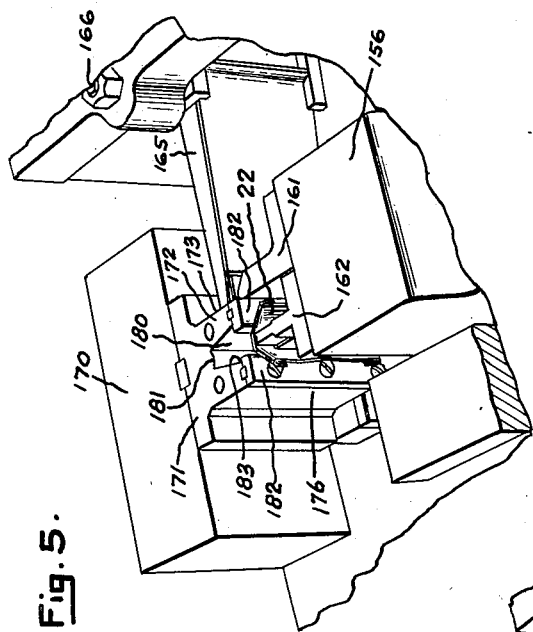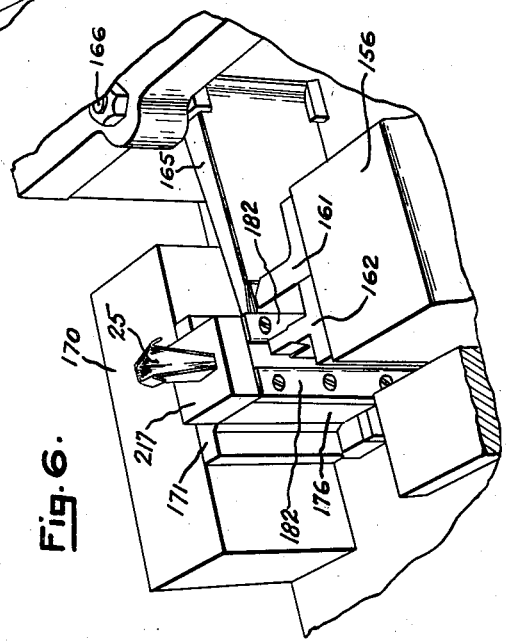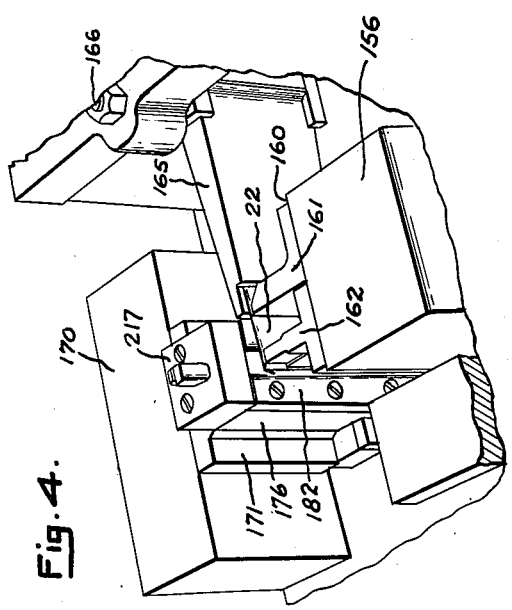

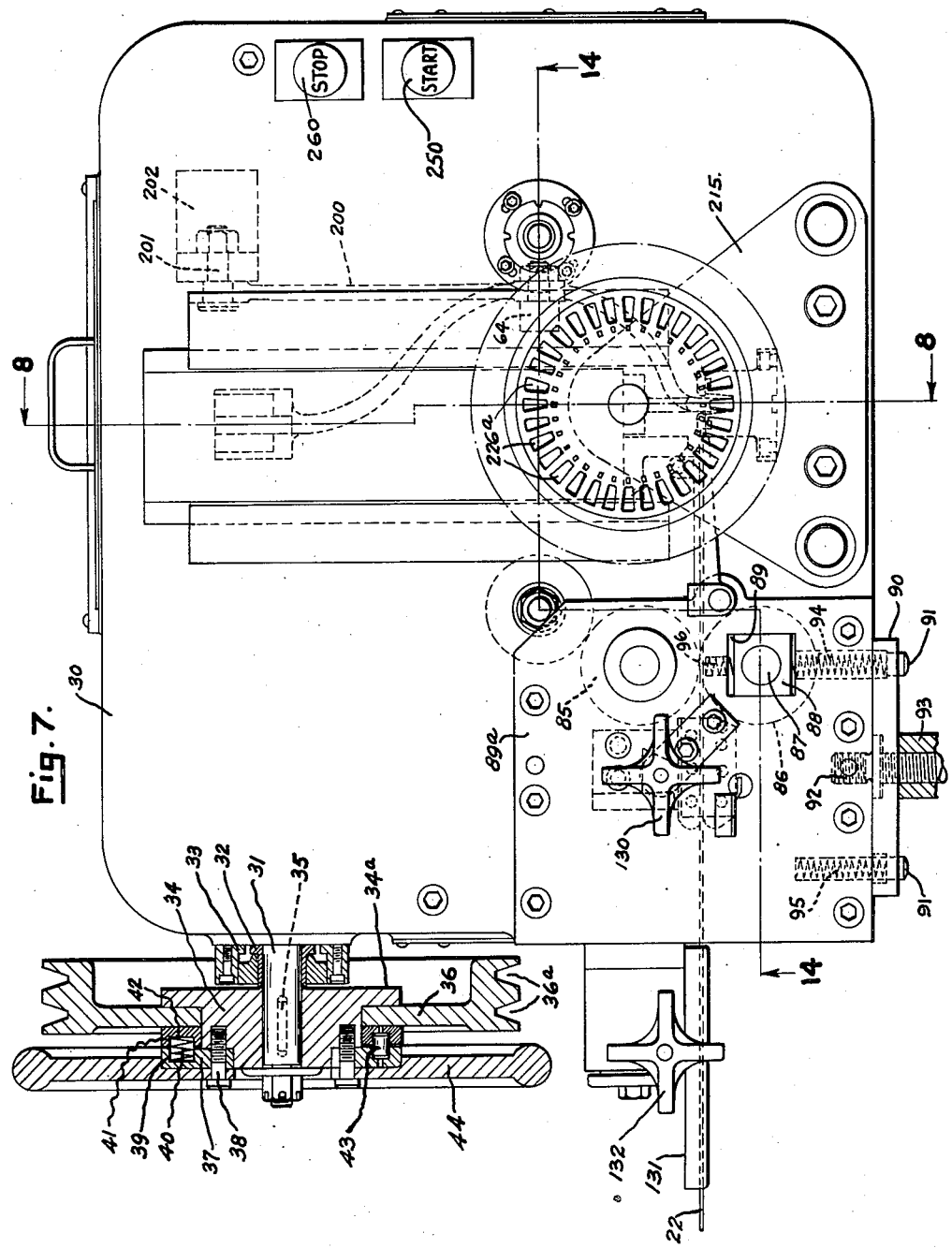

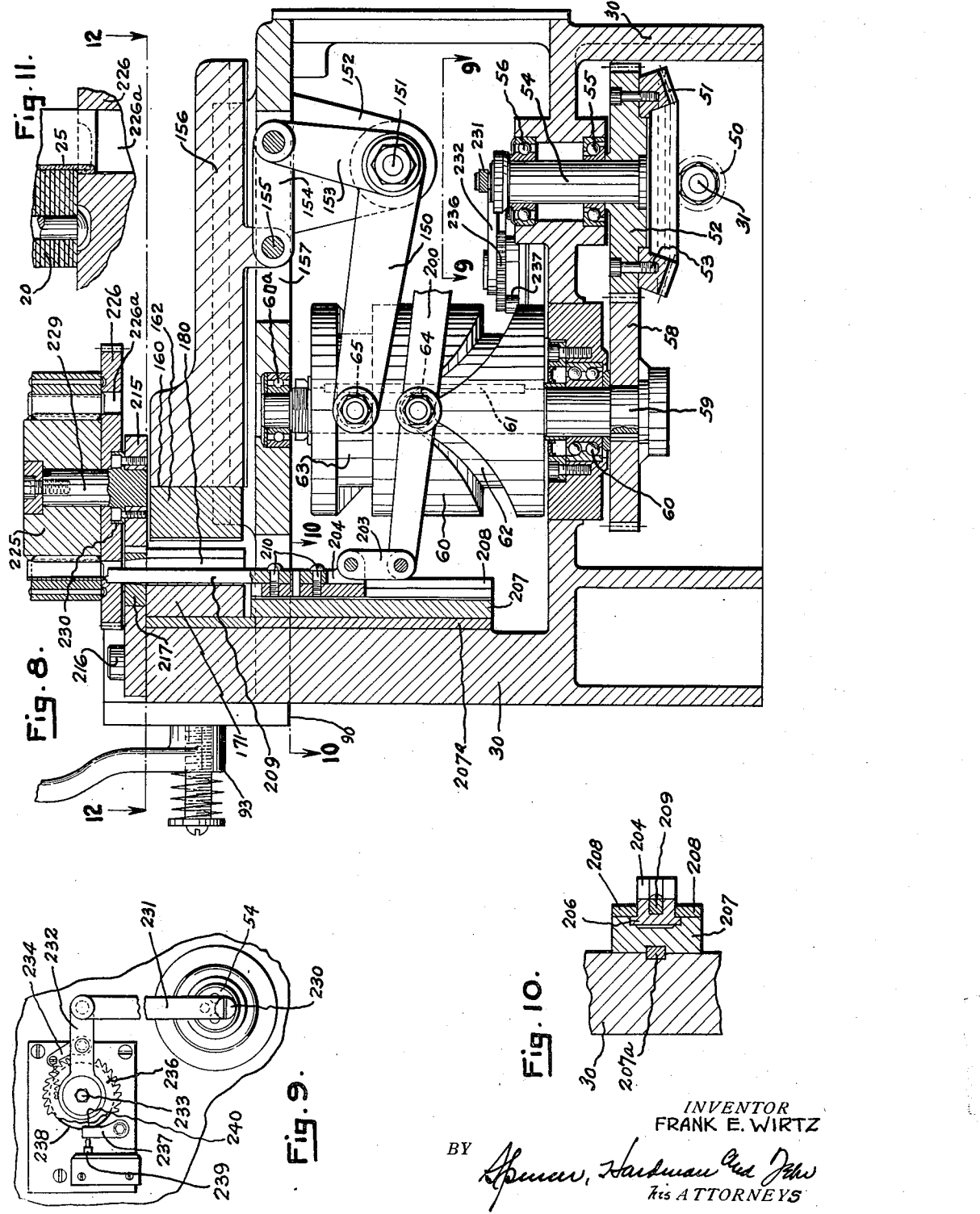

Feb. 1, 1944. F. E. WIRTZ 2,340,291
STATOR INSULATING MACHINE
Original Filed Feb. 20, 1941 10 Sheets-Sheet 6
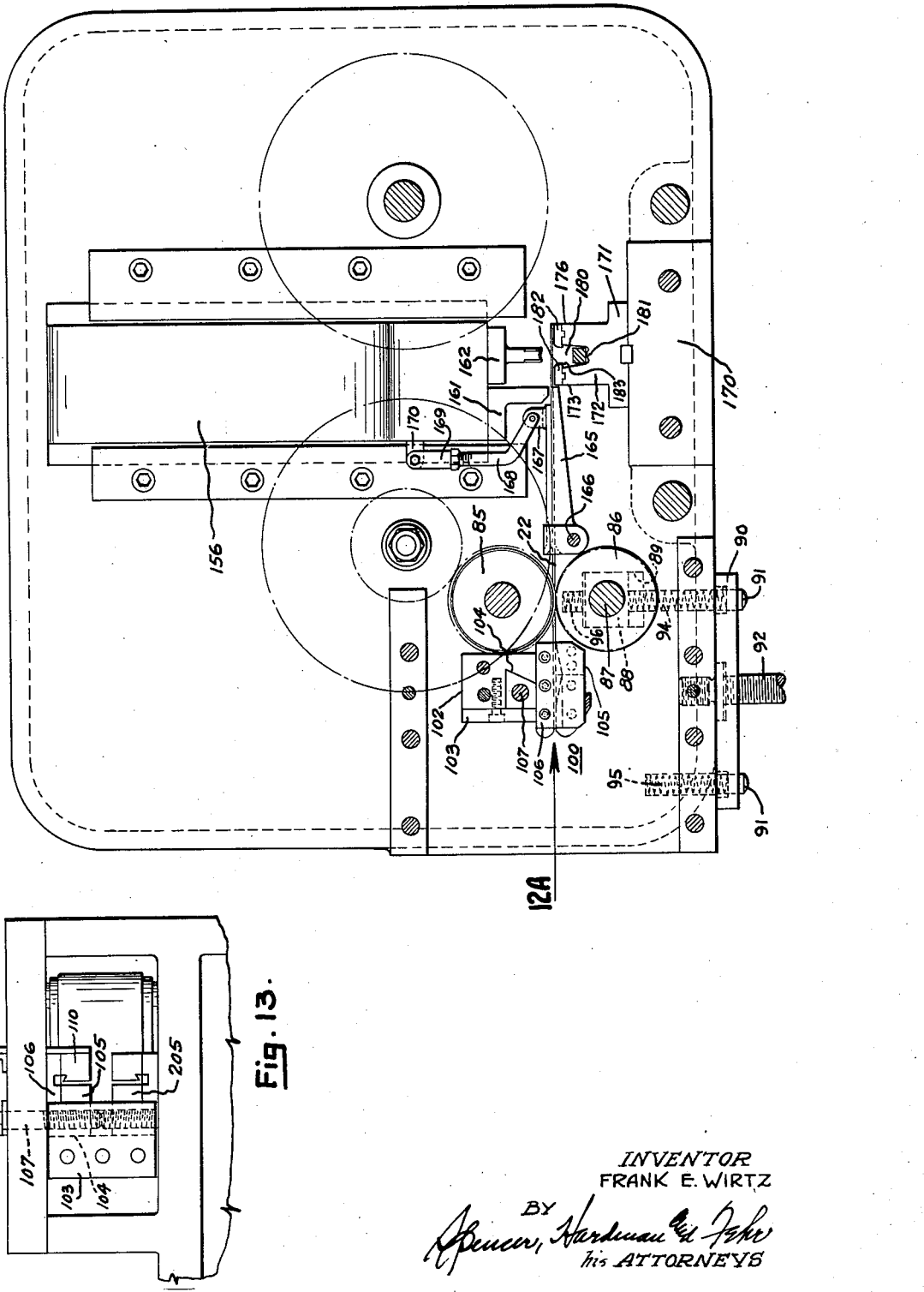
INVENTOR
FRANK E. WIRTZ
BY
his ATTORNEYS

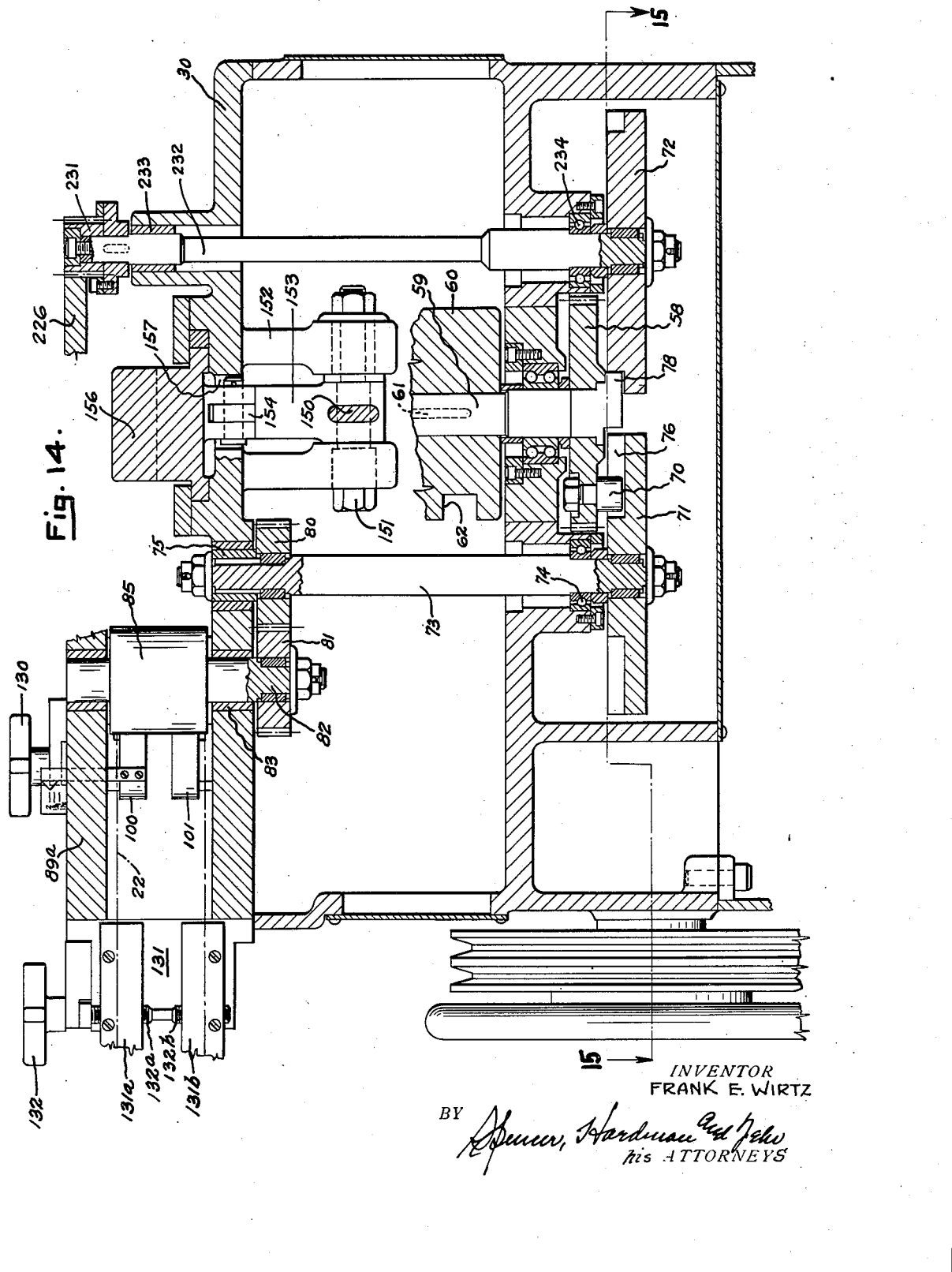

Feb. 1, 1944.　　　F. E. WIRTZ　　　2,340,291
STATOR INSULATING MACHINE
Original Filed Feb. 20, 1941　　10 Sheets-Sheet 8
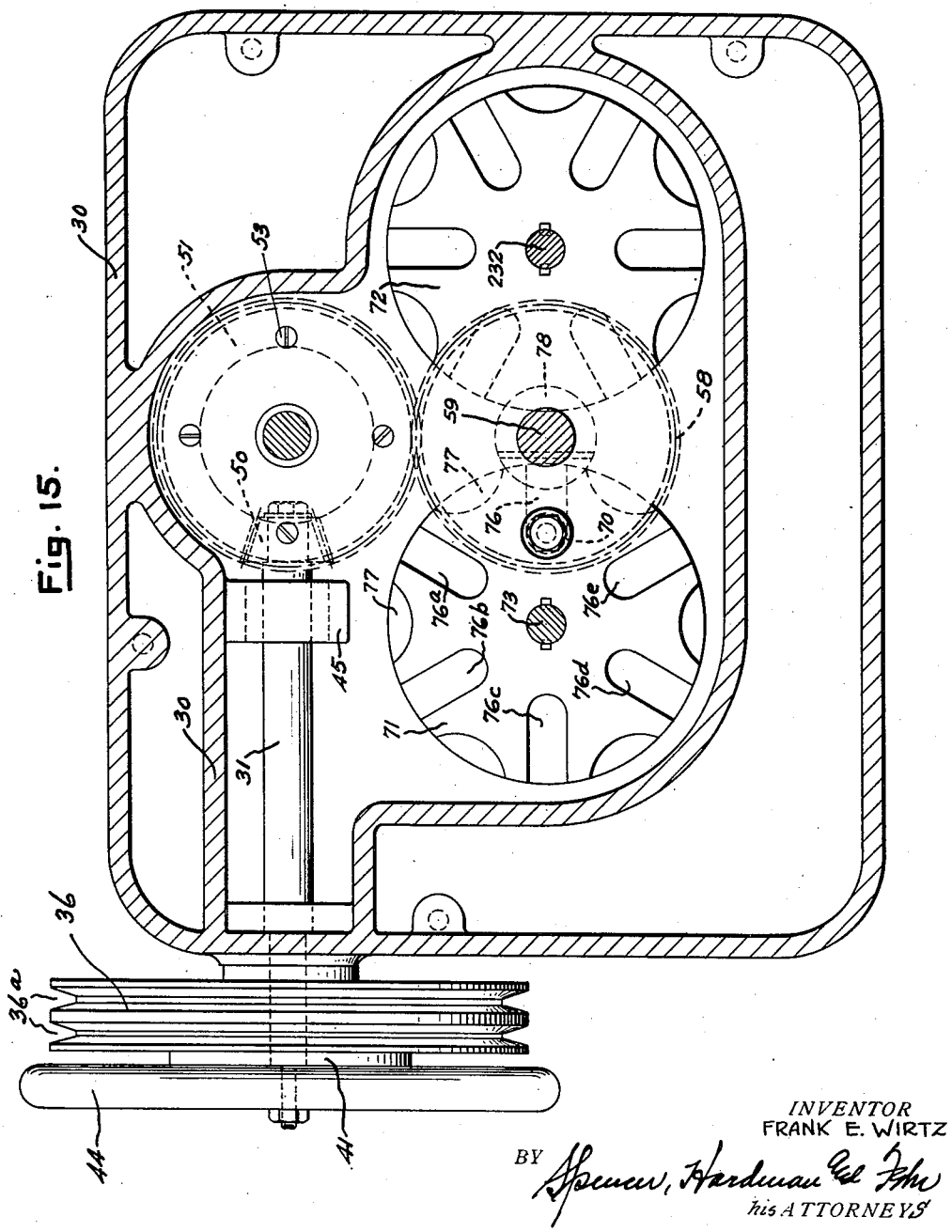
INVENTOR
FRANK E. WIRTZ
BY
his ATTORNEYS Feb. 1, 1944. F. E. WIRTZ 2,340,291
STATOR INSULATING MACHINE
Original Filed Feb. 20, 1941 10 Sheets—Sheet 9

INVENTOR
FRANK E. WIRTZ
BY
his ATTORNEYS

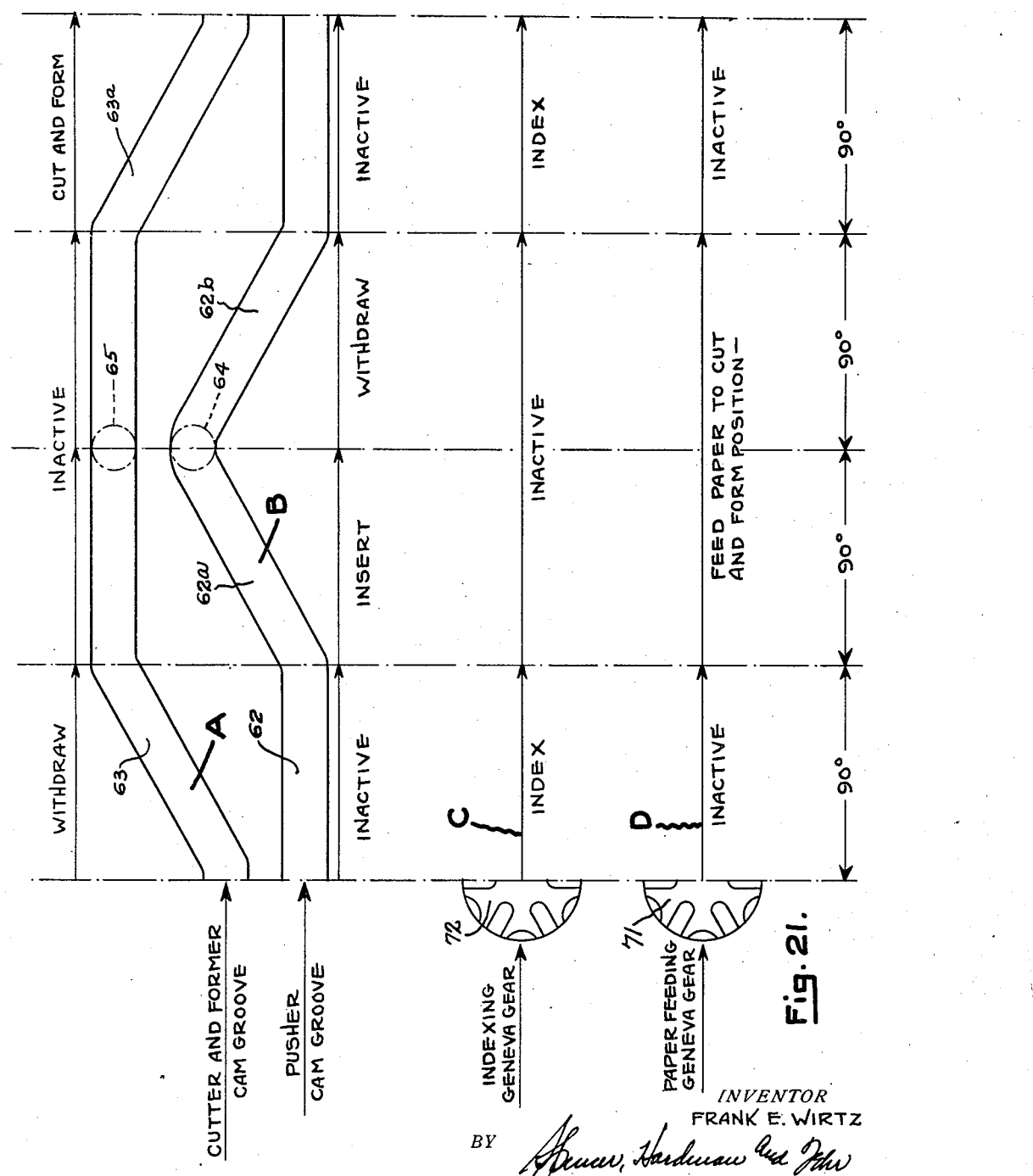

Patented Feb. 1, 1944

2,340,291

UNITED STATES PATENT OFFICE 2,340,291

STATOR INSULATING MACHINE

Frank E. Wirtz, Dayton, Ohio, assignor to General Motors Corporation, Detroit, Mich., a corporation of Delaware Substitute for abandoned application Serial No. 379,903, February 20, 1941. This application November 10, 1942, Serial No. 465,142

6 Claims. (Cl. 29—84)

This invention relates to a machine for lining the respective slots of stators or rotors with individual insulating members. The present application is a continuation of the original application Serial No. 379,903, Stator insulating machine, filed by this applicant, Frank E. Wirtz, on February 20, 1941.

It is among the objects of the present invention to provide a machine into which a continuous strip of insulating material is drawn and fed, said machine being capable of cutting and forming from said continuous strip of insulating material individual lining members and then inserting said formed members endwise into the respective slots of a stator or rotor.

A further object of the present invention is to provide a machine which is capable of cutting and forming individual insulating liners having a cuff shape, the end edges of which are provided with hem-like folds, then inserting each formed liner endwise into a slot of a stator or rotor so that the hem-like folds of the liner lie outside the confines of the slot and thereby lock the liner against accidental removal.

A still further object of the present invention is to provide a machine as described above with a rotatable stator or rotor support adapted to be actuated automatically to bring each succeeding slot of the stator or rotor into registry with the liner inserting means, in proper time relation with the completion of each respective liner by the machine.

These and other objects of the invention are attained by providing a machine which has means for intermittently drawing a measured length of a continuous strip of insulating material into the machine and while said material is being drawn or fed into the machine, is adapted to provide hem-like folds at the marginal edges of the strip material. While the strip material is stationary, that is, while the strip material is not being drawn into the machine, means are provided to cut off a length of the so-called material, after which other means become active to bend said length transversely into a cuff-like formation. When the operation of drawing the material into the machine is again resumed, means become active to push said cuff-shaped liner into the slot of the stator or rotor which has previously been moved into registry with a guide block through which the liner is forced on its way to the stator or rotor slot. The machine is adapted to cause each succeeding stator or rotor slot to be moved into registry with said guide block while the cutting and forming operation of the liner to be inserted into the slot being indexed, is effective.

Further objects and advantages of the present invention will be apparent from the following description, reference being had to the accompanying drawings wherein a preferred embodiment of the invention is clearly shown.

In the drawings:

Fig. 1 is a fragmentary perspective view of a stator for an electric machine into the slots of which liners are to be inserted.

Fig. 2 comprises four complementary views, marked A, B, C and D, and shows various progressive shapes of the strip material from the time it is being fed into the machine in a flat condition until the time it is inserted in the stator slot in its fully formed condition.

Fig. 4 is a fragmentary perspective view of the machine with certain parts removed and illustrating the cutting and folding mechanism of the machine. In this view the insulating material is shown being fed into the cutting and forming position.

Fig. 5 is a view similar to Fig. 4, however, in this view, the strip material is shown already cut and being pushed into the cuff-forming die.

Fig. 6 is a view similar to views 4 and 5 showing the strip after the cutting and cuff-forming operations have been completed and at a time when the liner inserting operation has been started.

Fig. 7 is a plan view of the machine, certain parts of the driving mechanism being shown in section to facilitate description.

Fig. 8 is a sectional view taken transversely through the machine along the line 8—8 of Fig. 7. In this figure certain parts are shown in elevation for purposes of clarity.

Fig. 9 is a fragmentary view taken in the direction of the line 9—9 of Fig. 8 and illustrates the timing mechanism.

Fig. 10 is a fragmentary sectional view taken along the line 10—10 of Fig. 8 and illustrates the method of slidably supporting the pusher element of the machine.

Fig. 11 is a fragmentary sectional view of a stator on the machine and a liner inserted therein.

Fig. 12 is a view taken in the direction of the line 12—12 of Fig. 8.

Fig. 13 is a fragmentary view of Fig. 12 taken in the direction of the arrow 12A.

Fig. 14 is a longitudinal sectional view on the machine, taken substantially along the line 14—14 of Fig. 7, certain parts being shown in elevation for the purpose of simplicity.

Fig. 15 is a part sectional view taken in the direction of the line 15—15 of Fig. 14. This figure shows the driving mechanism of the machine.

Fig. 21 is a composite chart showing the relative activities of various parts of the machine. The portion A of Fig. 21 shows one activating groove of the main driving barrel cam illustrated in Fig. 8.

The portion of this figure marked B shows another activating cam groove of the said barrel cam shown in Fig. 8.

The portion marked C illustrates the activities of one of the Geneva gears illustrated in Fig. 15, particularly the Geneva gear located at the right side of Fig. 15.

And the portion marked D of Fig. 21 shows the timed activities of the Geneva gear shown to the left of Fig. 15.

Figure 1:
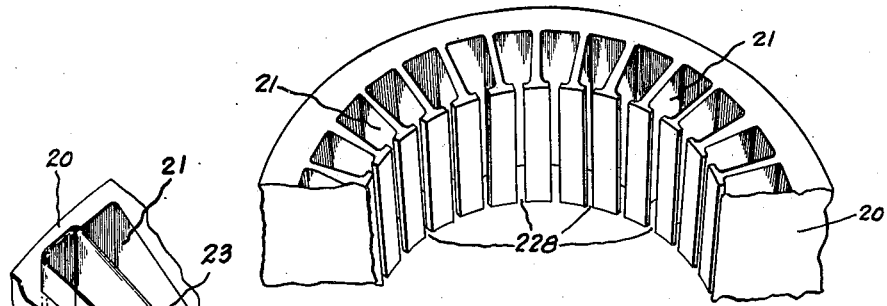
Figure 2:
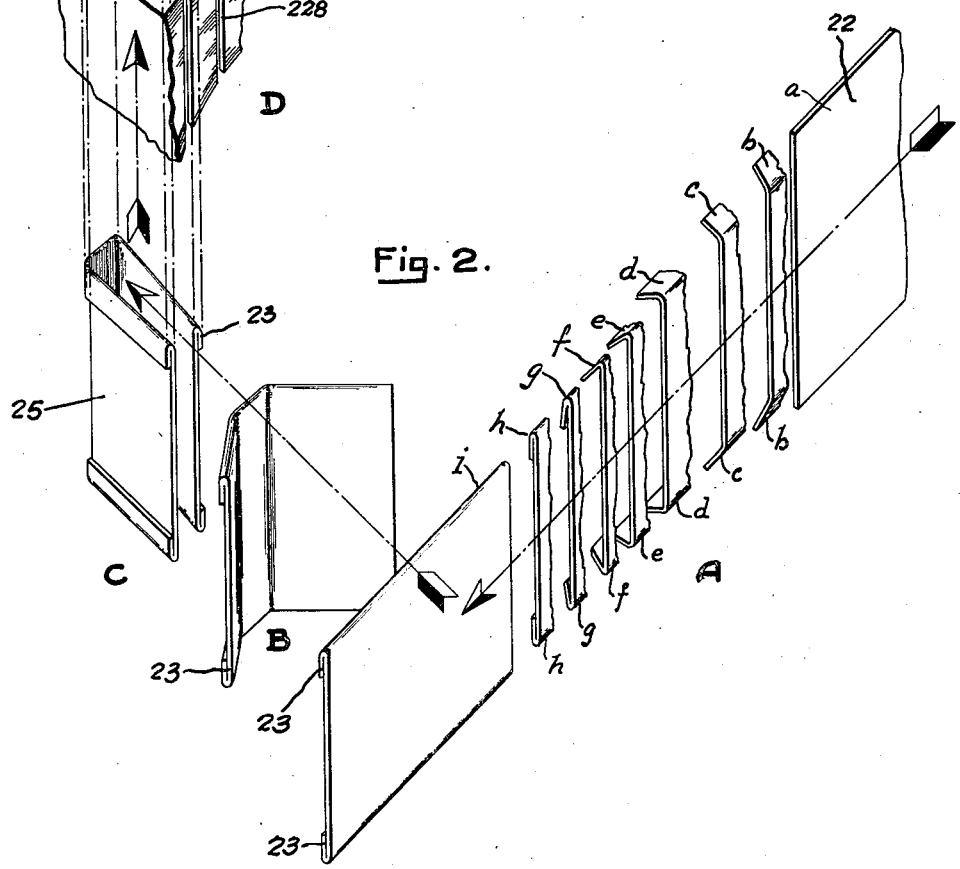

Referring to the drawings and more particularly to the sheet 1 thereof which includes Figs. 1 and 2, the numeral 20 designates a stator for an electric machine, the stator in the present instance having 32 slots, designated by the numeral 21, to be lined with insulating material.

As has been stated in the objects of the invention, the present machine is adapted to form insulators from a continuous strip of material, which is designated by the numeral 22. Two cooperating rollers are provided in the machine, between which the strip of material passes and by means of which the material is drawn into the machine. These rollers are intermittently active to draw a predetermined length of material into the machine, each length then being formed into the cuff-shaped liner. As the paper is drawn into the machine, certain guide and bending blocks, to be described detailedly hereinafter, bend over the marginal edges of the strip material to form a hem-like fold which in Fig. 2 is designated by the numeral 23. In this Fig. 2 the strip material in its normal flat condition as it enters the machine is designated by the letter a. As this material progressively moves through the machine the marginal edges are bent, certain progressive steps of this marginal bending of the strip being designated by the letters b, c, d, e, f, g and h. As will be described detailedly hereinafter, two sets of bending blocks cooperate to form the hem-like fold. The first block through which the paper passes will bend the marginal edges thereof through the steps b, c, and d, thus bending the marginal edge thereof at substantially 90° to the main body portion of the strip.

The next adjacent guide and bending block continues bending this marginal portion through the steps e, f, g and h, the letter h showing the complete hem-like bend. The letter i designates the material after both marginal edges have been provided with hem-like folds 23.

As the material passes from the guiding and bending blocks it is moved into the cutting and cuff forming position, and having arrived at this proper position the feed rollers become inactive and consequently movement of the material stops. Now a shearing means becomes active to cut off a predetermined length of this hem-folded strip. Immediately following the shearing operation a bending member becomes effective to bend this sheared-off length into the cuff shape designated by the letter C. The view marked B shows the strip in the intermediate cuff-forming position, that is, sometime during the cuff-bending operation. While the cutting and cuff-forming operation is taking place, mechanism in the machine adjusts the stator carrier into a position in which a slot thereof aligns with a certain apertured guide block. The cutting and forming operation having been completed as well as the indexing of a stator slot with said apertured guide block, means will now become effective to exert pressure upon the one end of the cuff-shaped liner shown at C to push it endwise upwardly through said certain apertured guide block into the slot of the stator aligned therewith. This liner is pushed into the slot until both its hem-folded end edges are outside the confines of the stator slot as shown in the view marked D. Inherent resiliency in the material forming the liner will permit it to expand and thus the edges of the hem-like folds will extend beyond the edges of the stator slot and over the flat surface of the stator, thereby locking the liner element against accidental removal from its slot. For purposes of description the completed cuff-shaped liner will be designated by the numeral 25. Following the arrows in the Fig. 2 which are intended to link all of the separate views A to D of this figure into a continuity, it may easily be seen that the machine introduces a flat strip of insulating material from a continuous source of supply and finally inserts a predeterminately shaped liner into the respective slots of a stator. The machine has mechanism for automatically indexing the stator carrier so that each succeeding stator slot is brought into a position to receive a liner, and after all slots are filled, the machine is adapted automatically to cease operation, as will be described.

Referring particularly to Figs. 7, 8, 14 and 15, the machine is shown comprising a main body portion 30 forming a housing and support for the various mechanisms. The main drive shaft of the machine is designated by the numeral 31. This shaft is journalled in a bearing carried by the machine housing but not shown, said housing having an oil seal 32 supported in a ring cage 33 which is attached to one wall of the machine housing 30. Shaft 31 extends outside the housing and has secured thereto a hub 34 in any suitable manner, a key 35 being inserted between the shaft 31 and its shaft 34 to assure both of them rotating together. A pulley 36 is rotatably carried upon the hub 34 engaging an annular flange 34a provided on said hub. The peripheral surface of said pulley has two peripheral grooves 36a for receiving V-type belts which are driven by a similar grooved pulley mounted upon any suitable driving means such as an electric motor or the like and not shown in the present drawings. A ring disc 37 is secured to the hub 34 by screws 38 so that it cooperates with the hub 34 and its flange 34a to form a spool-like assembly. The inner surface of said ring disc 37 has recesses 39 each forming a seat for one end of a compression spring 40. Interposed between said ring disc 37 and the pulley 36 there is a friction disc 41 also having recesses 42 in its surface adjacent the ring disc 37 corresponding to recesses 39 in said disc. Springs 40 in each recess 39 also are seated in the recesses 42 of the pressure or friction disc 41. The friction disc 41 is positively connected rotatably with the ring disc 37 by means of driving pins 43. The springs 40 are sufficiently heavy to drivingly clamp the pulley 36 between the friction disc 41 and the flange 34a of the hub 34 so that rotation of the pulley 36 by the source of power will result, under normal driving load conditions, in rotation of the hub 34 and its attached shaft 35.

Any overload in the machine, however, will overcome the effect of springs 40 to tightly clamp the pulley 36 between the friction disc 41 and the flange 34a of the pulley, so that the said pulley 36 will slip between said disc and flange and pulley 36 may rotate without imparting rotation to the machine. The screws or bolts 38 which secure the ring disc 37 to the hub 34 also secure a hand-wheel 44 to the disc 37, this hand-wheel 44 being used to rotate the machine manually when a fresh supply of material is to be inserted in the machine or also for machine adjustment purposes when such become necessary.

*Main driving mechanism*

In Fig 15 the main driving shaft 31 is shown journalled in a lug 45 extending from the body portion of the machine. At the end of shaft 31 there is secured a bevel pinion 50. This bevel pinion drivingly meshes with a bevel gear 51 secured to a gear 52 by screws 53 (see Fig. 8). The gear 52 is secured to a stub shaft 54 journalled in ball bearings 55 and 56 supported in bearing boxes provided by the wall of the housing 30. The end of stub shaft 54 opposite to that to which the gear 52 is secured actuates a timing mechanism which will be described detailedly hereinafter.

Gear 52 meshes with and is adapted to drive a similar gear 58 keyed to a shaft 59 which is journalled in ball bearings 60 and 60a, both these bearings being supported by the machine housing.

As shown in Fig. 8, the shaft 59 has a barrel cam 60 secured thereto by means of a key 61. This barrel cam has two working grooves, one designated by the numeral 62, the other by the numeral 63. These working grooves each have a roller extending into them, the roller extending into groove 62 being designated by the numeral 64, while the roller extending into groove 63 is designated by the numeral 65. For a clearer understanding of the relative working effects of these two grooves in the barrel cam 60, reference may be had to the portions A and B of Fig. 21 where these grooves are graphically charted, the activity of these grooves being shown in quadrants of movement. For the first quarter rotation of the barrel cam 60 the chart shows groove 62 to be inactive while groove 63 of said barrel cam is active. During the second quarter of the cam rotation, groove 62 is active, that is it moves its mechanism of the machine while groove 63 is inactive, that is, the mechanism cooperating therewith will not perform its function during this portion of the cam rotation. During the third quarter of cam rotation, groove 62 is still active while groove 63 is still inactive, and for the final and fourth quarter of cam rotation groove 62 will be inactive and groove 63 will be active.

The groove 62 of the barrel cam 60 actuates the pusher mechanism while the groove 63 of the barrel cam 60 actuates the mechanism which cuts off a predetermined length of strip material and forms it into a cuff-shape as has been previously stated. These mechanisms of the machine will be described in their proper turn later in the specification.

*Paper-feeding mechanism*

Figs. 14 and 15 more clearly illustrate the mechanism and its drive for drawing and feeding the strip material into the machine. As has already been stated, gear 58 is secured to and rotates shaft 59. This gear 58 carries a Geneva gear actuating stud 70 predeterminately spaced from its center. The Geneva gears which this stud 70 operates are designated by the numerals 71 and 72. Geneva gear 71 is secured to one end of a shaft 73 journalled in bearings 74 and 75 carried by the housing. The Geneva gear 71 has six equally spaced grooves 76, 76a, 76b, 76c, 76d, and 76e. In the Figs. 14 and 15 operating stud 70 is shown completely in the groove 76. Between each groove in the Geneva gear there is provided an arcuate notch 77 adapted to be engaged by a locking cam surface 78 formed on the end of shaft 59. In the Figs. 14 and 15 this locking and accentric cam surface on shaft 59 is lockingly engaging an arcuate groove in the Geneva gear 72 locking it against any possible rotative movement. Shaft 73 to which Geneva gear 71 is attached has a pinion 80 secured thereto which operatively meshes with another pinion 81 drivingly secured to the shaft 82 journalled in a bearing 83 of the housing. This shaft has the feeding roller 85 secured thereto or formed integral therewith.

It has been said in the aforegoing part of this specification that the strip material is intermittently drawn and fed into a machine for predetermined and measured lengths. Constant rotation of the gear 58 by gear 52 which is secured to gear 51 driven by pinion 50 secured to the main driving shaft 31 will result in constant rotation of shaft 59. If for instance shaft 59 rotates clockwise as regards Fig. 15, then the Geneva gear moving stud 70 on gear 58 will rotate the Geneva gear 71 counter-clockwise through one-sixth of a rotation inasmuch as the Geneva gear 71 has six grooves with which driving stud 70 operatively engages. Stud 70 will move said Geneva gear a predetermined portion of its complete rotation, or until the stud 70 completely moves out of the radial groove 76 thereupon continued rotation of shaft 59 will bring the locking eccentric cam 78 of said shaft 59 into locking engagement with the notch 77 provided between radial grooves 76 and 76e. As a result, pinions 80 and 81 are rotated predeterminately and consequently roller 85 will likewise be predeterminately rotated. Thus a predetermined length of material will be moved by said roller 85 inasmuch as said roller 85 cooperates with a free roller 86 to clamp the strip material between them as clearly shown in Figs. 7 and 12. Roller 86 is secured to or formed integral with a stub shaft 87 carried in sliding blocks 88. Sliding blocks 88 are slidably supported in aligned rectangular openings 89 provided in plate 89a attached to the machine and in the wall of the machine directly beneath said plate, the rectangular openings being longer than the dimension of the slidable block 88 in a direction coincidental with a plane passing through the centers of both rollers. Thus roller 86 is adjustable toward and away from its cooperating roller 85.

The adjusting mechanism for roller 88 comprises a plate 90 supported by guide pins 91 secured in the side of the machine as shown in Figs. 7 and 12. A screw stud 92 is rigidly secured in the side of the machine and slidably extends through an opening in plate 90. In Fig. 8, screw stud 92 is shown having the hub of a handle 93 threaded thereon. The inner end of this hub engages plate 90. Springs 94 extend through holes in the body portion of the machine into the openings 89 in which blocks 88 are slidably supported and engage said blocks, urging them to force their roller 86 toward and against the other roller 85. The springs 94 also seat in recesses in the inner surface of plate 90. Similar springs 95 extend into recesses in the body and into corresponding recesses in the plate 90. Other springs 96 are set in recesses in the machine and engage the surface of block 88 diametrically opposed to the surface of said blocks engaged by springs 94, these springs urging the blocks to separate roller 85 from roller 86 when the handle 93 is rotated in one direction. From the aforegoing it may be seen that when handle 93 is screwed upon the screw stud 92 to move toward the machine, it will move plate 90 against the machine and thereby compress springs 94 to move the blocks 88 and the roller 86 supported thereby toward the roller 85. When it is desired to move roller 86 away from roller 85, handle 93 is rotated on stud 92 so that it moves away from the body of the machine, thereby relieving the pressure of spring 94 upon the blocks 88 of roller 86 and consequently permitting springs 96 to become effective to push the roller 86 away from the roller 85. As the strip material passes between rollers 85 and 86, the power-driven roller 85 will draw said paper from the supply spool between the rollers and into the machine. When it is desired to insert a new supply of paper between the rollers, the handle 93 is operated to relieve the pressure of roller 86 against roller 85, thereby greatly facilitating the introduction of the sheet material between the rollers.

The measured intermittent rotation of gears 80 and 81 by shaft 73 due to the intermittent movement of the Geneva gear 71 will consequently rotate the power-driven roller 85 predeterminately. Thus there will be drawn into the machine each time the Geneva gear is actuated a measured length of strip material.

Hem-forming mechanism

As the strip material is drawn into the machine by rollers 85 and 86, it is passed through supporting guide blocks first for the purpose of holding said material in proper aligned relation with the rollers and, secondly for the purpose of providing hem-like folds at the marginal edges of said strip material before said strip material passes between said rollers. Each marginal edge of the paper is supported by such guides and folding mechanism. Inasmuch as the guide and folding mechanism for each marginal edge of the strip material is identical, only one of the mechanisms will be described detailedly. In Figs. 7, 12, 14 and 16 to 20 this guide and forming mechanism is clearly illustrated.

Referring to Fig. 14, the strip material previously referred to by the numeral 22 is shown in dot-dash lines. The guide mechanism for both marginal edges of this strip material is also shown. The mechanism for guiding and forming the upper marginal portion is designated by the numeral 100, the mechanism for the lower marginal edge being designated by the numeral 101. In Fig. 12 the arrow 12a shows where and in what direction the strip material enters into the guideway provided by the mechanism at the upper edge of the strip material. This mechanism comprises two cooperating blocks 102 and 103 secured together and also rigidly attached to the machine and providing a slide-way 104. A supporting plate 105 shown in Fig. 16 has one portion to which forming block 106 is anchored, the other portions of this supporting plate 105 being key-shaped, slidably to fit in the slide-way 104, this key-shaped portion of plate 105 being provided with a threaded hole to receive the threaded adjusting screw 107, which is so mounted as to be incapable of longitudinal movement. Thus when the screw 107 is turned, the supporting block 105 threadedly engaging said screw will move longitudinally in the slide-way 104.

Figures 17, 18:
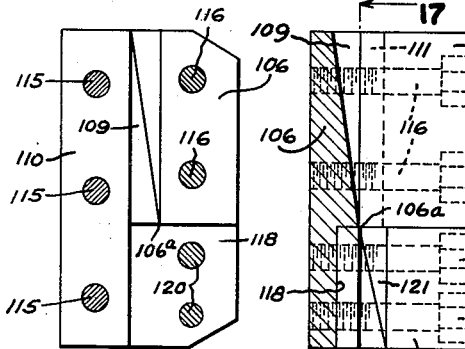
Fig. 17 is a flat view of one of the forming guides provided with a groove having a sloping surface which causes said groove gradually to dissolve and diminish from full size at its one end to nullity in the surface of the block at its opposite end. This figure is taken in the direction of the line 17—17 of Fig. 18, which is a sectional view taken longitudinally along the line 18—18 of Fig. 19.
Figure 19:
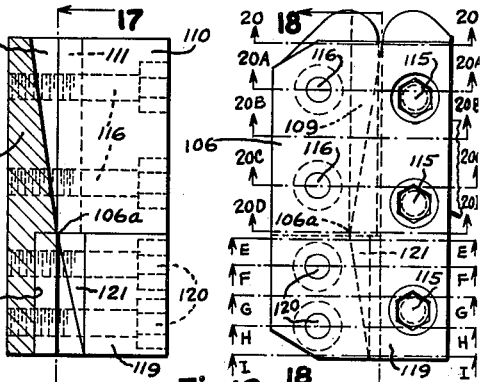
Fig. 19 shows the forming blocks for one marginal portion of the strip material.
Figure 20E:
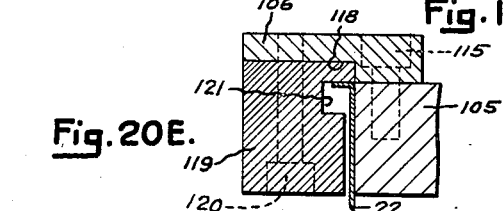
Figs. 20E, 20F, 20G, 20H and 20I are transverse sectional views taken along the lines EE, FF, GG, HH and II of Fig. 19 and show the diminishing groove in the second marginal forming block.
Figure 20:
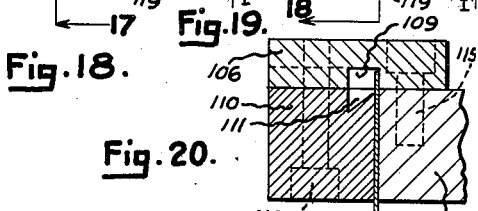
Figs. 20, 20A, 20B, 20C and 20D are transverse sectional views taken along the lines 20—20AA, BB, CC and DD of Fig. 19 and show the changing shape of the diminishing groove in the one forming block.
Figure 20F:
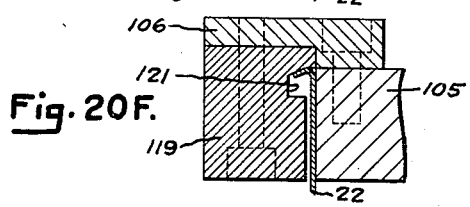
Figure 20A:
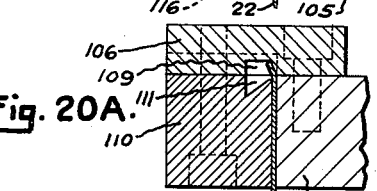
Figure 20G:
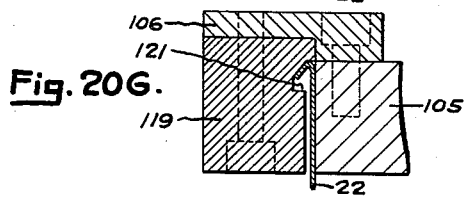
Figure 20B:
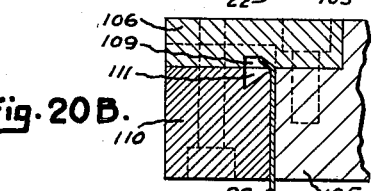
Figure 20H:
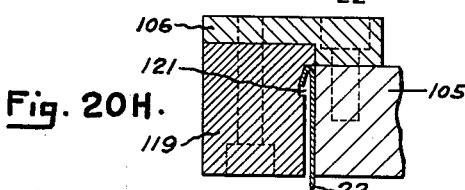
Figure 20C:
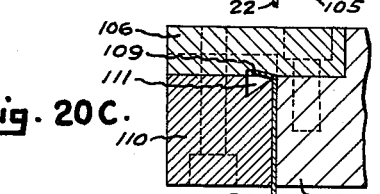

The block 106 is one of two cooperating blocks which fold over the marginal edge of the strip material. This block 106 has a groove 109 which will be described detailedly. Block 106 is screwed to a cooperating block 110, said cooperating block 110 having a V-shaped groove 111 directly opposed to and aligning with the groove 109 in block 106. The surface of block 110 adjacent the supporting block 105 is spaced from said block 105 a distance slightly greater than the thickness of the strip material adapted to pass between said blocks 110 and 105 whereby this portion of said strip material is supported between said blocks as it is being drawn into the machine by the rollers. In the Fig. 20 a cross sectional view of the two cooperating grooves 109 and 111 of blocks 106 and 110 respectively is shown taken along the line 20—20 of Fig. 19. This section is taken at the entrance end of said grooves, that is at the end of the grooves first traversed by the strip material as it enters the machine. It will be noted that the strip material 22 extends beyond the line of contact between blocks 106 and 110, a marginal portion of the strip material projecting into the groove 109 of block 106. This groove 109 is so designed and constructed that as the material passes through said groove the marginal edge thereof extending into the groove 109 will be progressively bent as shown in Figs. 20 to 20D so that it will be at right angles to the main body portion of the material. At its entrance end, groove 109 in block 106 is rectangular cross sectionally. A surface of said block slopes in such a manner that it provides a generating surface which causes said groove to diminish and dissolve from its full size cross sectional area at the entrance end into nullity in the surface of block 106 adjacent block 110 at its exit and or at the end 106a of block 106, as shown in Figs. 17, 18 and 19. In Fig. 20 the full rectangular cross sectional groove is shown. In Fig. 20A the sloping upright surface is shown encroaching on the upper ceiling of the groove. Fig. 20B shows a greater encroachment; Fig. 20C shows a still greater encroachment and a diminution of the depth of the groove, while Fig. 20D shows absolute nullity as to groove depth, the groove having dissolved and disappeared into the surface of block 106 engaging block 110.

Figs. 16 to 20 inclusive show block 106 secured to the supporting block 105 by means of screws 115 passing downwardly from the block 106 into the supporting block 105. Block 106 is secured to its cooperating block 110 by means of screws 116 which pass upwardly through the cooperating block 110 into the block 106.

From the aforegoing description it will be seen that as the strip material 22 enters into the space between the blocks 110 and 105 and passes through the diminishing groove 109, the marginal edge portion of the strip extending into said groove will be bent at right angles to its main body portion. After this right-angled bend is made in the marginal portions of the strip, said strip will pass between two aligned cooperating blocks to further bend this marginal portion so that it will be folded from right angle position into actual contact with the main body of the strip as shown in the Fig. 20I. These cooperating blocks are in direct alignment with the blocks 106 and 110.

Figure 20I:
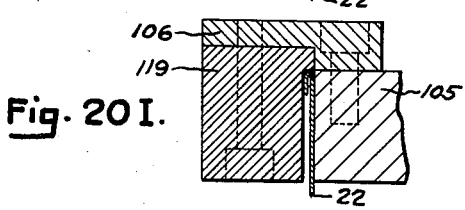
Figure 20D:
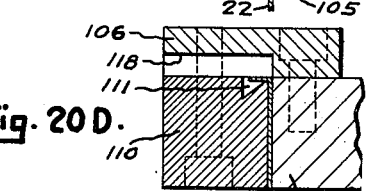

Figs. 20E to 20I inclusive show how these blocks effect folding of the marginal portion of the strip. One end of the bottom surface of block 106 is recessed as at 118 to receive the second forming block 119 which is secured to the block 106 by means of screw studs 120 passing upwardly through block 119 into the block 106. The surface of block 119 adjacent the supporting block 105 has a groove 121 whose upper surface is flush with the bottom surface of the block 106 as shown in the Fig. 20E. Thus this upper surface of groove 121 will first be contacted by the upper edge of the right-angled bent marginal edge of the strip material as it passes from the first forming block 106 into the groove 121 of the second forming block 119. The edge of the block 119 adjacent supporting block 105 is so spaced from said block 105 that it provides a supporting guide-way for the marginal portion of the strip material as it passes between blocks 119 and 105. Groove 121 like groove 109 has a sloping surface which causes said groove to dissolve and diminish from full size rectangular cross sectional shape at its entrance end to nullity in the surface of block 119 adjacent block 105 at its opposite end; thus as will be seen in Figs. 20E to 20I inclusive, the upper or sloping surface of groove 121 as it approaches the exit end of the groove 121 will not only dissolve and disappear, but also the other two surfaces of said groove will likewise diminsh as shown in these progressive figures so that the bent marginal portion of the strip engaging said sloping surface will progressively be bent from right-angled position relative to the main body of the strip into a hem-like fold in which said bent portion substantially engages the main body portion of the strip as shown in Fig. 20I.

The hem-like fold in both marginal portions of the strip will be compressed and set as it passes between the two rollers 85 and 86 inasmuch as said hem-like folds are formed in the strip while the paper is being drawn to approach rollers 85 and 86.

In order that these blocks are properly adjusted for the width of the strip material being used, they are carried by supporting blocks 105 threadedly carried on a threaded shaft 107. This is clearly illustrated in the Figs. 13 and 14. Here block 105 of the upper hem-folding mechanism and similar block 205 of the lower hem-folding mechanism are shown threadedly carried by the stud 107 which is rotatably supported by the machine housing wall. This stud has a small hand-wheel 130 secured thereto. The threaded portion of stud 107 carrying block 105 will move the block in one direction longitudinally of the stud when the wheel 130 is rotated in one direction, while the threaded portion supporting block 205 will move said block in the opposite direction in response to such turning of the wheel 130. Thus if wider paper is to be used the wheel 130 is actuated to move blocks 105, 205 apart, while on the contrary if a narrower strip material is used, wheel 130 is actuated in an opposite direction to cause blocks 105 and 205 to move toward each other. Another supporting guide mechanism 131 is provided on the machine ahead of the hem-forming blocks and is adapted slidably to support the paper and maintain it in properly aligned position relative to said forming blocks. Like the forming blocks it has an adjusting wheel 132 by which said mechanism may be actuated to adjust it for various widths of strip material. This guideway mechanism 131 comprises slideway blocks 131a and 131b which threadedly engage threaded portions of a chart of adjusting wheel 132, the threaded portion 132a being of a different direction than the threaded portion 132b in order to procure opposite movement of said blocks 131a and 131b in response to rotation of the wheel 132 in one direction or the other.

*Cutting and forming mechanism*

The cutting and forming mechanism of the machine is clearly illustrated in the three perspective views, Figs. 4, 5 and 6 and the sectional view Fig. 8. The barrel cam 60, as has been said previously in this specification, has a working cam groove 63 adapted to move a follower roller 65. To this roller 65 is secured one end of a lever 150 which lever is hingedly carried by an eccentric portion of a pin 151 supported by a lug 152 formed on a wall of the machine housing. The portion of the pin 151 on which the lever 150 is pivotally supported is eccentric to the main body of the pin so that an adjustment of the range of movement of lever 150 may be altered as necessary by rotation of said pin in the lug 152. Lever 150 has an angular arm 153, the end of which is secured to a link 154 which is also connected by a pin 155 to a sliding block 156, shiftably supported in a suitable slideway provided on the top wall of the machine. Fig. 8 shows the depending lug of the sliding block 156 to which link 154 is secured as extending downwardly through an opening 157 in the top wall of the machine. This sliding block 156 shown in Fig. 4 has an end surface 160 upon which are mounted members 161 and 162. Member 161 is the shearing member, while member 162 is the punch cooperating with a die to form the cuff-shaped lining member. The material 22 shown in Fig. 4, after passing between rollers 85 and 86, enters a guiding gate 165 clearly shown in Fig. 12, as well as Figs. 4, 5 and 6. This guiding gate is hingedly carried by a pin 166 supported by a stationary plate of the machine. The swinging gate 165 normally is in the position shown in Fig. 12. On its surface opposite that engaged by the sliding strip material 22 said swinging guiding gate has an ear 167 to which is anchored one end of an angular lever 168, the opposite end of said lever having an adjustable clevis 169, anchored by means of an ear 170 to the slide block 156. A block 170 of the machine body has the die member 171 secured thereto. This die member has a portion 172, one edge 173 of which cooperates with the member 161 attached to slide block 156 to provide means for transversely shearing the strip of material. It has been described heretofore that power-driven roll 85, being rotated a predetermined amount, will cause a measured length of material to be moved at intervals into the machine. This strip material 22 passing along the swinging gate 165, which guides it in a plane lying somewhat to the front of die 171, will, due to its predetermined movement properly space this material relative to the die. More specifically, this material is so moved that its end will substantially align with the side 176 of the die when the roller has completed its feeding movement.

As the drum 60 rotates, the roller 65 will be moved through a path as indicated graphically in the chart portion A of Fig. 21. While inactive the slide block 156 with its shearing member 161 is in the position as shown in Figs. 4 and 8, in which position the cam roller 65 is in the two central quadrant areas shown in the chart. Now as the cam 60 continues to operate, roller 65 will enter the groove portion 63a causing the lever 150 to be rotated counterclockwise about its eccentric hinge pin 151. This moves the slide block 156 forwardly and consequently moves the element 161 into shearing relation with the die surface 173 transversely to shear off the strip material along the line of this surface 173. Forward movement of the slide block 156 also moves the forming member 162 forwardly, causing it to engage the cut-off strip portion 22 immediately before the shearing operation has been completed. After the shearing is completed, member 162 will push said strip into the V-shaped recess 180 formed in the die 171. The forming member 162 is shown in Fig. 5 in the act of pushing the cut-off strip portion 22 into this recess 180. Member 162 will push said cut-off strip material completely into said recess 180 so that it will engage the rear surface 181 of said recess. Resiliency of the strip material together with the convex-concave cooperating surfaces of the member 162 and bottom of recess 181 respectively will cause the two side arms thereof to spread and engage the side walls of recess 180. Plates 182 are secured to the outer surface of the die 171, these plates extending beyond the confines of the recess 180 so as to form shoulders 183. These shoulders are engaged by the edges of the cuff-shaped material lying in the recess 180 and prevent removal of said material from said recess when the forming member 162 is withdrawn by reverse movement of the slide block 156. This reverse movement of said slide block results in response to the roller 65 moving through the groove 63 from its lowermost point, in the first quadrant of the chart shown in Fig. 21, view A, to the uppermost portion of the groove in the second and third quadrant, which portions show the cam groove to be inactive. The space between the two adjacent surfaces of the flange plates 182 is sufficient to permit the forming member 162 and the strip material on each side thereof to pass therethrough. As soon as this cuff-shape bending operation is completed, the liner inserting mechanism becomes active.

*Liner inserting mechanism*

The mechanism for pushing and inserting the cuff-shaped liner lying into the recess 180 of die 171, into the stator will now be described. The barrel cam 60 has a working groove 62 shown diagrammatically in the chart B, Fig. 21. A roller 64 extends into groove 62, said roller being secured to a lever 200, one end of which is supported by the pivot pin 201 shown in Fig. 7, said pin extending into an elongated hole in the bracket 202 of the machine for adjustment purposes. By adjusting the pivot pin 201 into different positions in the elongated hole in bracket 202, the travel of the liner inserting means actuated by lever 200 may be varied as necessary. As shown in Fig. 8, the opposite end of said lever is connected to a forked link 203, which is pivotally secured to a member 204. This member has a flanged base 206 as shown in the cross section, Fig. 10, slidably supported in a slideway provided by a block 207 and its two attached tracks 208. Block 207 is attached to a wall of the machine housing and is properly located thereon by the locating key 207a. A pusher element 209 is secured to the sliding member 204 by means of screws 210. This pusher element, when inactive, normally does not extend up into the recess 180 of the die 171. When the roller 64 is in the first and fourth quadrants of the groove 62, as shown in chart B of Fig. 21, the lever 200 will be in its lowermost position at which time pusher element 209 will be outside the confines of recess 180 in the die 171. However, as the barrel cam 60 rotates, roller 64 on lever 200 will move through portions 62a and 62b of groove 62 as indicated in chart B, Fig. 21 and as the roller moves through these two quadrants of the cam rotation, the pusher will be moved upwardly into and through the recess 180 and then downwardly from said recess into its normal inactive position. As the pusher 209 moves upwardly it engages the bottom edge of the cuff-shaped liner 25 lying in the recess 180 of the die 171 and moves said cuff-shaped liner endwise upwardly. The upper surface of a wall of the machine has a plate 215 secured thereto by bolts 216. This plate has an opening in which an apertured guide block 217 is positioned, so that said block is interposed between the stator carrier on the machine and the recess 180 from which the cuff-shaped liner is pushed to be inserted into the stator. The aperture in guide block 217 tapers, its larger end conforming to the shape and size of the recess 180 in the die block 171 and aligning therewith. Thus the cuff-shaped liner in the recess 180 may easily slide from said recess into the adjacent larger end of the aperture in guide block 217. The opposite end of the aperture in guide block 217 conforms exactly in size and shape with the size and shape of the slot in the stator carrier through which the liner is pushed as it is moved into the stator slot. Thus as the liner passes from the recess 180 in the die 171, which recess is of greater size transversely than the size of the slot in the stator into and through the guide block 217, said liner is constricted by the tapering aperture in said guide block, thereby holding the liner to the exact size of the stator slot transversely and thus assuring its ready insertion into the stator slot. The Fig. 6 illustrates a liner 25 being ejected from the guide block 217, the stator not being in position in this view to receive it, thus the liner is shown expanding beyond the size of the stator slot due to its own resiliency and assuming a wider dimension than the width of the stator slot.

It will be noted that in accordance with the operating charts A and B of Fig. 21, while the cutting and forming members 161 and 162 are being moved toward or away from the cooperating portions of the die 171 by the sliding block 156, which activity takes place during the fourth and first quadrants of the operation, the pusher element 209 is inactive. On the other hand, when the pusher element is active, moving into the recess 180 of the die 171 during the second quadrant of the cam operation, chart B of Fig. 21, and while the said pusher element 209 is withdrawn from the recess 180 during the third quadrant of operation the cutting and forming members 161 and 162 on the slide block 156 are inactive. Thus at no time can the forming member 162 enter the recess 180 concurrently with the pusher element 209, their movements being positively controlled by the relatively arranged cam slots 62 and 63 in the barrel cam 60.

*Indexing mechanism*

Figure 3:
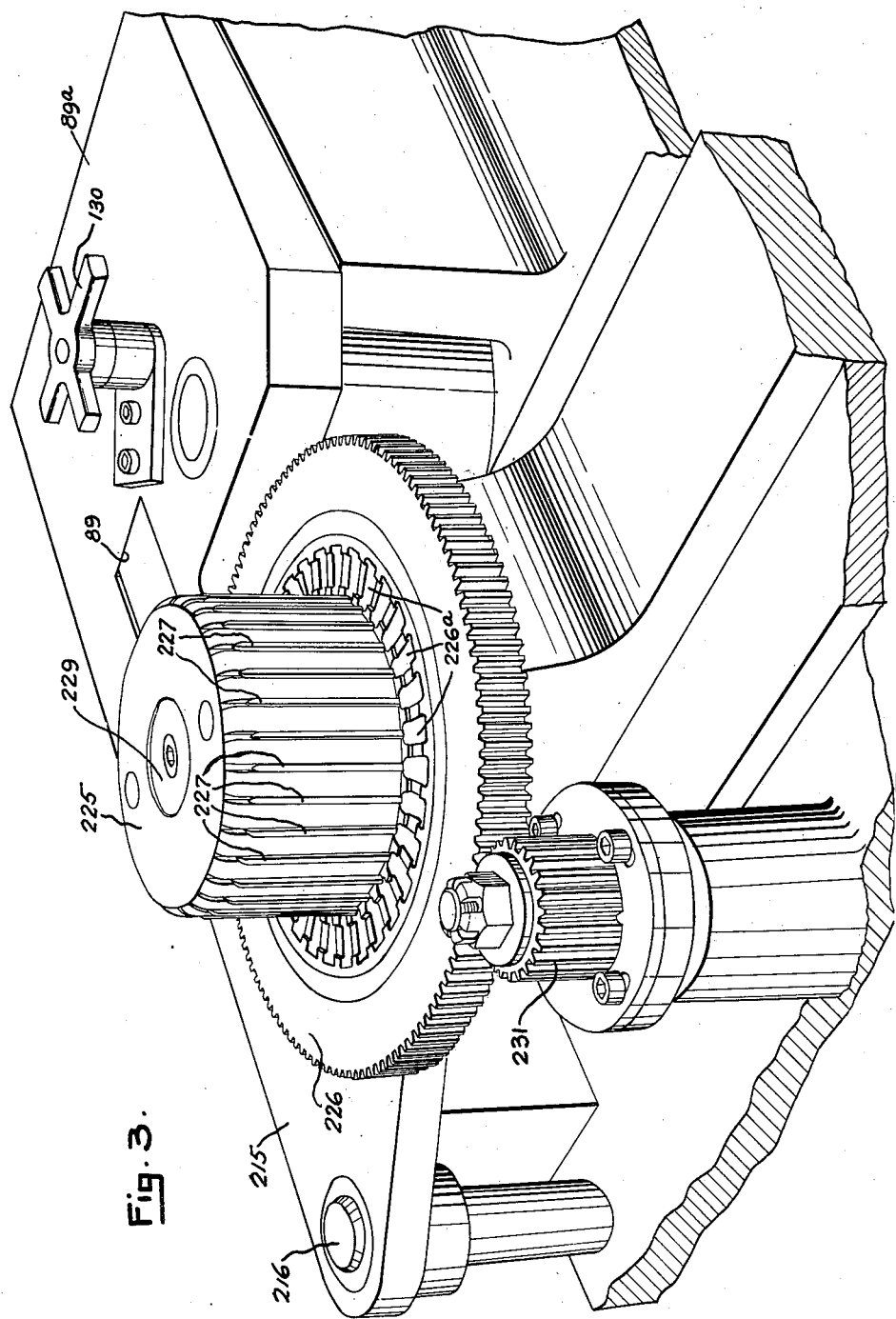
Fig. 3 is a fragmentary perspective view showing the stator supporting end indexing member of the machine and its driving pinion.
Figure 16:
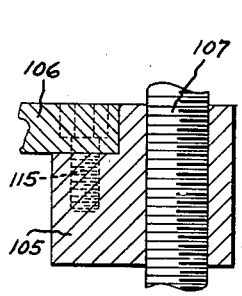
Fig. 16 is a fragmentary sectional view showing the threaded adjustable mounting of one of the forming guides of the machine.

The Figures 3, 8 and 14 most clearly illustrate the indexing mechanism. As has previously been mentioned, the stator into which liners are to be inserted is provided by the machine with 32 slots. The machine has a stator carrier comprising a hub portion 225 coaxially secured to a gear 226 in any suitable manner. This gear has slots 226a coinciding in number, size and shape to the slots in the stator. The hub has radial ribs 227 equal in number to the slots in the stator, said ribs being adapted to locate the stator in proper position on the hub by entering the respective open ends 228 of said slots when the stator is placed upon the hub. These radial ribs 227 thus assure proper positioning of the stator on the gear 226 so that each slot in the stator aligns with a corresponding slot in the gear. The stub shaft 229, upon which the hub 225 and gear 226 are rotatably supported, is anchored to the plate 215 in any suitable manner. A flange 230 on said shaft is seated in a recess in the gear 226, forming an end bearing upon which the gear 226 rotatively rests. This gear 226, as shown in Fig. 14, meshes with a pinion 231 adjustably attached to the end of the shaft 232 which is journalled in the housing by bearings 233 and 234. Shaft 232 has its end, opposite gear 231, secured to the Geneva gear 72 which, as shown in Fig. 15, is similar to Geneva gear 71, being provided with six equally spaced radial grooves adapted to be engaged by the operating stud 70 of the driving gear 58. This stud 70 as it rotates, is capable of moving the Geneva gear 72 one-sixth revolution after which the locking eccentric cam 78 of shaft 59 will engage one of the arcs 72a of the Geneva gear 72 to lock it against any further rotative movement while the operating stud is actuating the Geneva gear 71. When said stud has actuated Geneva gear 71 it will approach and enter another radial groove of Geneva gear 72 to actuate it. In the meantime the locking cam 78 will have entered an arcuate notch 77 of Geneva gear 71 to lock it against rotation while Geneva gear 72 is being rotated. The measured partial rotations of the Geneva gear 72 together with the predetermined sizes of gears 231 and 226 will intermittently rotate the stator carrier so that each succeeding slot thereof is moved into register with the aperture in the guide block 217.

An inspection of Fig. 21 and particularly the chart C thereof clearly shows that the indexing Geneva gear 72 with its gear 231 and the stator carrying gear 226 become active to move the next adjacent empty slot of the stator into alignment with the aperture of the guide block 217 at such a time when the cutting and forming mechanism including members 161 and 162 are active and when the pusher member 209 is inactive or, more specifically, when said member 209 is at rest in its normal inoperative position. The indexing Geneva gear 72 is inactive, however, during the two intermediate quadrants of operation of the barrel cam 60 during which said barrel cam is maintaining the cutting and forming members 161 and 162 inactive and at the same time is moving the pusher member 209 into and out of the recess 180. It may also be noted in this Fig. 21 that the indexing Geneva gear 72 is always active when the paper feeding Geneva gear 71 is inactive and vice versa.

*Operation control*

To line a stator with insulating members the operator places a completely empty stator upon the carrying hub 225 making sure that the radial ribs 227 on a hub each fit into an open end 228 of a stator slot. This assures complete alignment of all stator slots with corresponding slots in the gear 226. After the stator has been placed in position the operator presses the starting button 250 which completes the circuit to the driving motor and causes the machines to operate. One complete rotation of the barrel cam 60 is necessary for lining one stator slot. Gear 58 being attached to shaft 59 to which the barrel cam is also attached must consequently make one complete revolution for the completion of a stator slot lining operation. Gears 58 and 52 are of similar size and consequently gear 52 must then rotate one complete revolution for each cycle of the slot lining. Shaft 54 rotates with gear 52 and inasmuch as gear 52 and shaft 54 must rotate once for each stator slot lining operation, 32 revolutions thereof will be necessary to completely line all of the 32 slots of the present stator. In order automatically to stop the machine after the stator has been completely lined there is provided an automatic stopping mechanism shown in Figs. 8 and 9. A pin 230 extends eccentrically from the end of shaft 54. It has one end of a lever 231 connected thereto, the other end of said lever being attached to the free end of an arm 232 pivotally carried by a stud 233. This stud also rotatably carries a ratchet wheel 236 provided with 32 ratchet teeth. The ratchet wheel has a hub 238 in the peripheral edge of which there is a flat face 240. A pawl 234 on the arm 232 is yieldably maintained in engagement with the teeth of the ratchet wheel. The range of movement of arm 232 is such that for each reciprocation thereof a new ratchet tooth is engaged by the pawl 234, consequently the ratchet wheel is rotated the distance of one tooth for each revolution of the shaft 54. A pivoted lever 237 controls the switch 239. When the lever 237 rides on the peripheral edge of hub 238 it is held to close the switch 239. However, once in every revolution of the ratchet wheel, lever 237 will rest upon the flat section 240 on the hub, then lever 237 may move to release the switch button, permitting switch 239 to open its circuit. Relays are provided which cooperate with the starting button 250 in such a manner that when the switch 239 is open, and switch 250 is pressed, said relays will complete the motor circuit around switch 239 to effect starting of the machine. However, after the machine has started, rotation of shaft 54 will effect operation of the ratchet wheel to again cause the lever 237 to ride upon the higher peripheral hub surface and again close switch 239. When this switch is again closed the relays are so effected that a later opening of said switch 239 will again stop the machine. These electrical controls are all of standard parts and are well known, applicant has merely utilized one rotating part to effect operation of a timing mechanical movement to set into operation the standard electrical controls for circuits. Thus when a stator has been completely lined, the machine will automatically stop. After removal of the finished stator, the operator merely slips another empty stator upon the carrier hub 225, then presses the start button 250 to again institute a lining operation by the machine. A stop button 260 permits the operator to stop the machine at any time during a cycle of stator lining.

From the aforegoing description it is shown that applicant provides a comparatively simple machine of strong construction and substantially foolproof, that is, substantially impossible for interference between timed operations which is adapted to draw and feed strip insulating material into the machine. The machine, while the material is being drawn and fed into it, has stationary and rigid mechanism which turns over a marginal portion of the strip to form a hem-like fold at each edge thereof, the feature of this mechanism being its rigidity and thus dependability. Another mechanism in the machine cuts the material fed into the machine by predeterminately driven rollers and at the proper time folds said cut-off lengths into cuff formation transversely of the strip so that the hem-like folds thereof are its end edges. Another mechanism successively indexes the stator carrier so that its slots will be in proper alignment with a guide block through which a still further mechanism of the machine pushes the cuff-shaped liner into aligned slots of the stator. All parts are so designed and built that at no time is it possible to effect one operation to the detriment of another, for instance while the cutting and forming operation is taking place the indexing of the stator carrier is positively effected and while the pushing member is inserting the bent and formed liner into the stator slot, the paper feeding mechanism is positively effective to introduce by measured length the continuous strip material in the machine.

I claim:

1. A machine for forming individual stator slot liners from insulating material and inserting them into the slots of a stator, comprising in combination, a rotatable plate for supporting the stator, said plate having perforations coinciding with the slots in the stator; a punch and die; means adapted intermittently to move the material between the punch and die; means for actuating the punch to force the material into the die to give it a cuff-like shape; a guide block interposed between the die and stator supporting plate, said block providing a tapered guideway the ends of which conform in size and shape and aline with the openings in the die and supporting plate respectively; a plunger movable into the die to force the shaped piece therein endwise through the guide block and supporting plate into a stator slot; means for intermittently moving the plate to bring the respective perforations thereof into registry with the guide block and means for operating the strip moving means, the forming punch actuator, the plunger and the plate moving means, all in proper time and sequence.

2. A machine for producing individual stator slot liners from insulating material comprising in combination, a forming die provided with a longitudinal channel open at both ends; a punch for entering said channel and defining a U-shaped die channel; means intermittently operated to move the material between the punch and die; means for moving the punch to force the material into the U-shaped channel of the die to give it a U-shape; a plunger movable into the one end of the die channel for engaging and moving the shaped material in said die endwise therefrom and into a stator slot alined therewith and means for effecting properly timed operation of the material moving means, the punch and the plunger.

3. A machine in accordance with claim 2 differing, however, in that a guide block is provided between the stator and die, said block having a tapered passage aligning with and providing communication between a slot in the stator and the U-shaped channel in the die, whereby the formed piece is constricted and guided into the stator slot when the plunger pushes it endwise from the die.

4. A machine for producing individual stator slot liners from insulating material comprising in combination, a forming die having a longitudinal channel similar in cross-sectional shape to the stator slots but of greater transverse dimension than said slots, said channel being open at both ends and at the front; a punch adapted to be moved into the open front of the die to force the insulating material into the die and give it a cuff-like shape; means intermittently operable to move the material between the punch and die; an actuator for the punch; a guide block between the die and stator said guide block having a tapering passage the larger end of which coincides and aligns with the one end of the die passage the smaller end coinciding and aligning with a slot in the stator; a plunger adapted to be moved into the die passage for pushing the cuff-shaped material from said die into the guide block, the tapering passage in said block constricting said cuff-shaped member and guiding it into the alined stator slot; means for moving the stator supporting means intermittently, successively to align the respective slots of the stator with the guide block and means for effecting operation of the material moving means, the actuator for the punch and the plunger, all in proper time and sequence.

5. A machine for forming individual stator slot liners from a strip of insulating material and inserting them into open-ended stator slots, comprising in combination; means for supporting a stator, a die having a recess in end-to-end alignment with the length of a supported stator slot, said recess having an open end communicating with the open end of a stator slot and an open side for receiving a strip of insulating material; a punch moving transversely of said recess and stator slot and through the side of said recess to shape a strip of material; means for moving a strip of material between said punch and die; means for actuating the punch for causing it to engage said material and force it into the die to shape it; a plunger at right angles to said punch, movable into the die from the end opposite said open end to force the shaped material endwise along said recess and into a stator slot; and means for operating said strip moving means, said punch actuating mechanism and said plunger in proper sequence.

6. A machine for forming stator slot liners from a strip of insulating material and inserting them into the slots of a stator, comprising in combination, a plate having perforations corresponding in shape and arrangement to the slots in the stator, said plate providing a support for the stator; means mounting said plate for rotation; a forming die; means for moving the strip material in front of the die; a punch for forcing said material into the die to give it a cuff-like shape; actuating means for said punch; a guide block interposed between the die and stator supporting plate, said block having a tapered passage aligning with the die block and a perforation in the supporting plate; a plunger movable into the die to push the formed piece therein through the guide block and supporting plate into the aligned stator slot; means for intermittently rotating the supporting plate successively to align the respective perforation therein with said guide block; and means for operating said strip moving means, for operating said punch actuating means, for operating said plunger and for actuating said intermittently rotating means in proper sequence.

FRANK E. WIRTZ.